US008627434B2

(12) United States Patent
Dooley et al.

(10) Patent No.: US 8,627,434 B2
(45) Date of Patent: Jan. 7, 2014

(54) CROSS SECURITY-DOMAIN IDENTITY CONTEXT PROJECTION WITHIN A COMPUTING ENVIRONMENT

(75) Inventors: Alan P. Dooley, Poughkeepsie, NY (US); Walter B. Farrell, Woodstock, NY (US); Arthur L. Fitzpatrick, III, Port Ewen, NY (US); Richard H. Guski, Red Hook, NY (US); Russell D. Hardgrove, Poughkeepsie, NY (US); Deborah F. Mapes, Port Ewen, NY (US); Christine A. Marusek, Red Hook, NY (US); Mark A. Nelson, Poughkeepsie, NY (US); Eric Rosenfeld, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 12/631,354

(22) Filed: Dec. 4, 2009

(65) Prior Publication Data
US 2011/0138452 A1    Jun. 9, 2011

(51) Int. Cl.
*H04L 29/06* (2006.01)
(52) U.S. Cl.
USPC ............................................................ 726/8
(58) Field of Classification Search
None
See application file for complete search history.

(56) References Cited

U.S. PATENT DOCUMENTS

| | | |
|---|---|---|
| 5,581,765 A | 12/1996 | Munroe et al. |
| 5,604,490 A | 2/1997 | Blakley, III et al. |
| 5,764,745 A | 6/1998 | Chan et al. |
| 6,085,188 A | 7/2000 | Bachmann et al. |
| 6,105,131 A | 8/2000 | Carroll |
| 6,112,186 A | 8/2000 | Bergh et al. |
| 6,157,953 A | 12/2000 | Chang et al. |
| 6,256,031 B1 | 7/2001 | Meijer et al. |
| 6,353,621 B1 | 3/2002 | Boland et al. |
| 6,360,222 B1 | 3/2002 | Quinn |
| 6,574,721 B1 | 6/2003 | Christenson et al. |
| 6,643,685 B1 | 11/2003 | Millard |
| 6,708,170 B1 | 3/2004 | Byrne et al. |

(Continued)

OTHER PUBLICATIONS

"Technical Identity Management," NetReference Architecture for Applications Infrastructure, pp. 1-14, (http://www.burgontgroup.com/content/nss/architecture/tech_positions/identity/identity_cont . . . ) Nov. 8, 2001.

(Continued)

*Primary Examiner* — David Pearson
(74) *Attorney, Agent, or Firm* — William A. Kinnaman, Esq.; Kevin P. Radigan, Esq.; Heslin Rothenberg Farley & Mesiti P.C.

(57) ABSTRACT

Processing within a computing environment is facilitated by: determining by a local security manager of a first system in a first security domain whether a local security context of a user is acceptable to a second system in a second security domain; responsive to the user's security context being unacceptable to the second system, creating by a local security manager of the second system a runtime security context for the user in the second system; and providing the first system with a reference to the runtime security context for the user in the second system which is resolvable within the computing environment or a portable representation of the runtime security context for the user in the second system, the reference or the portable representation being subsequently returned to the second system with a request from the first system to process work at the second system.

18 Claims, 4 Drawing Sheets

(56) References Cited

U.S. PATENT DOCUMENTS

| | | | |
|---|---|---|---|
| 6,760,780 | B1 | 7/2004 | Chitturi et al. |
| 6,981,043 | B2 | 12/2005 | Botz et al. |
| 7,032,003 | B1* | 4/2006 | Shi et al. ............... 709/203 |
| 8,112,789 | B2* | 2/2012 | Halls et al. ................ 726/4 |
| 2002/0016184 | A1 | 2/2002 | Helaine et al. |
| 2002/0091757 | A1 | 7/2002 | Cuomo et al. |
| 2002/0093857 | A1 | 7/2002 | Cole |
| 2002/0133330 | A1 | 9/2002 | Loisey et al. |
| 2002/0161840 | A1 | 10/2002 | Willcox et al. |
| 2002/0184504 | A1 | 12/2002 | Hughes |
| 2002/0184507 | A1 | 12/2002 | Makower et al. |
| 2003/0005118 | A1* | 1/2003 | Williams ............... 709/225 |
| 2003/0177388 | A1 | 9/2003 | Botz et al. |
| 2004/0220947 | A1 | 11/2004 | Aman et al. |
| 2004/0230831 | A1* | 11/2004 | Spelman et al. ........... 713/201 |
| 2004/0237093 | A1 | 11/2004 | Sluiman et al. |
| 2005/0183068 | A1 | 8/2005 | Cwalina et al. |
| 2006/0107036 | A1 | 5/2006 | Randle et al. |
| 2006/0288228 | A1 | 12/2006 | Botz et al. |
| 2007/0234417 | A1* | 10/2007 | Blakley, III et al. .......... 726/12 |
| 2010/0116880 | A1* | 5/2010 | Stollman ................. 235/380 |

OTHER PUBLICATIONS

"Extending ARM for End-to-End Correlation and Optimization of E-service Transactions", Sahai et al., HPL-2000-168, Hewlett Packard Laboratories, 8 pgs. (Dec. 11, 2000).

"Correlating Business Workflows with IT End-to-End Transaction," Emuchay et al., IBM DOSS: AUS920050545 (2 pgs.) Aug. 3, 2005.

"User-Defined Audit Trail Records in Workflow Management Systems," Roller et al., IBM RD DE820010202, RD n450 Oct. 2001, Article 106, p. 1741 (4 pgs.) Oct. 2001.

"Context-Controlled Topic-Based Publication in Workflow Management Systems," Roller et al., IBM RD DE820010202, RD n 450 Oct. 2001, Article 108, p. 1744 (3 pgs.) Oct. 2001.

"Merging Log Files from Components of a Multi-Tier System Using TSpaces," Alan Knox, IBM RD GB20000120, RD n439 Nov. 2000, Article 111, p. 1995 (2 pgs.).

Kormann, et al.; "Risks of the Passport Single Signon Protocol," Computer Networks, The International Journal of Computer and Telecommunications Networking, vol. 33 (2000) Nos. 1-6, Jun. 2000, pp. 51-58.

"Microsoft Looks to East Windows/iSeries Integration," dated Aug. 23, 2004, printed Aug. 31, 2004, http://www.iseriesnetwork.com/artachive/index.cfm?fuse-action+viewarticle&CO__ContentID=19108&cha . . . .

Guski, et al.; "Authenticated Identity Propagation and Translation Within a Multiple Computing Unit Environment," filed Jan. 9, 2009 as U.S. Appl. No. 12/351,291.

z/OS—Security Server Racroute Macro Reference, IBM Publication No. SA22-7692-12, Thirteenth Edition, Sep. 2009, pp. 211-273.

z/OS—Security Server RACF Command Language Reference, IBM Publication No. SA22-7687-14, Fifteenth Edition, Oct. 2009, pp. 392-398.

z/OS—Security Server RACF Security Administrator's Guide, IBM Publication No. SA22-7683-13, Fourteenth Edition, Sep. 2009, pp. 703-715.

z/OS—Security Server RACF Data Areas, IBM Publication No. GA22-7680-11, Twelfth Edition, Sep. 2009.

z/Architecture Principles of Operation, IBM Publication No. SA22-7832-07, Feb. 2009.

\* cited by examiner

200 — ON SYSTEM 1, WHEN THE APPLICATION WISHES TO SEND WORK TO SYSTEM 2, IT CAN ISSUE A NEW QUERY OPERATION PROVIDING:
  (A) THE USER'S LOCAL SECURITY CREDENTIALS, COMPRISING A USER ID, GROUP MEMBERSHIP, PORT OF ENTRY, SECURITY LABEL, AND OTHER SECURITY RELEVANT INFORMATION MAINTAINED BY THE LOCAL SECURITY MANAGER; AND
  (B) THE DESTINATION OR TARGET SYSTEM'S NAME (I.E. THE NAME OF SYSTEM 2) WITHIN THE SYSPLEX, OR ADDRESS IF OUTSIDE OF THE SYSPLEX.

210 — IN RESPONSE TO THE QUERY, THE LOCAL SECURITY MANAGER OF SYSTEM 1 DETERMINES WHETHER THE USER'S LOCAL SECURITY CREDENTIALS ARE ACCEPTABLE TO SYSTEM 2. "ACCEPTABLE" ENCOMPASSES TWO TESTS (A) IS THE TARGET SYSTEM USING THE SAME SECURITY MANAGER, AND (B) IF SO, IS IT ALSO USING THE SAME SECURITY DATABASE (OR ONE COMPATIBLE INSOFAR AS THE USER IDENTITIES, GROUP MEMBERSHIPS, ETC.)? IF THE CREDENTIALS ARE ACCEPTABLE, THEN THE LOCAL SECURITY MANAGER OF SYSTEM 1 RETURNS AN INDICATION THAT THE LOCAL SECURITY INFORMATION CAN BE SENT TO SYSTEM 2, AND WILL OPTIONALLY RETURN AN ENCAPSULATED COPY OF THOSE SECURITY CREDENTIALS WHICH THE APPLICATION CAN SEND TO THE TARGET SYSTEM 2 WITH ITS WORK REQUEST.

220 — IF THE LOCAL CREDENTIALS ARE DEEMED UNACCEPTABLE TO SYSTEM 2, THE LOCAL SECURITY MANAGER CONTACTS (VIA NETWORKING DATA FLOWS OR PARALLEL SYSPLEX DATA FLOWS) THE SECURITY MANAGER OF SYSTEM 2 (E.G., RACF ON SYSTEM 1 WILL CONTACT RACF OR OTHER SECURITY MANAGER ON SYSTEM 2), PROVIDING THE LOCAL SECURITY CREDENTIAL INFORMATION IN A NEUTRAL FORMAT UNDERSTANDABLE BY ALL SECURITY MANAGERS, OF THE SYSPLEX.

230 — THE LOCAL SECURITY MANAGER ON THE TARGET SYSTEM (E.G., RACF ON SYSTEM 2) RECEIVES THE USER'S CREDENTIALS IN NEUTRAL FORMAT, AND PERFORMS A "MAPPING" OPERATION USING RULES ESTABLISHED BY SYSTEM 2 SECURITY ADMINISTRATOR TO DERIVE A SET OF SECURITY CREDENTIALS FOR THE USER ACCEPTABLE TO SYSTEM 2. THIS MAPPING OPERATION MAY INVOLVE:
  (A) A LOOKUP OPERATION USING AS INPUTS OF THE REMOTE SYSTEM USER ID AND REMOTE SYSTEM NAME (SYSTEM 1) AND POSSIBLY ADDITIONAL IDENTIFYING INFORMATION FOR THE SYSTEM (SYSPLEX NAME, NETWORK DOMAIN, ETC). THE OUTPUT IS A USER ID ACCEPTABLE TO SYSTEM 2.
  (B) A SIMILAR LOOKUP FOR EACH GROUP NAME PROVIDED IN THE SECURITY CREDENTIALS, TO ENABLE TRANSFORMATION INTO GROUP NAME(S) ACCEPTABLE TO THE SYSTEM.
  (C) A SIMILAR LOOKUP FOR THE PORT-OF-ENTRY INFORMATION ASSOCIATED WITH THE USER, IF DESIRED BY SYSTEM 2 SECURITY ADMINISTRATOR.
  (D) A SIMILAR LOOKUP FOR THE SECURITY LABEL ASSOCIATED WITH THE USER (AGAIN, IF DESIRED BY SYSTEM 2 SECURITY ADMINISTRATOR).

TO STEP 240

FIG. 2A

CROSS SECURITY-DOMAIN IDENTITY CONTEXT PROJECTION WITHIN A COMPUTING ENVIRONMENT

BACKGROUND

The present invention relates to facilitating cross security-domain processing within a multi-system computing environment.

Over time, multi-system computing environments have developed comprising the same or different operating systems and software requirements. These systems may be within the same or different security domains, with each security domain maintaining its own set of user security credentials. Within a security domain, a user registry is provided which includes a list of users and information, such as a user ID and password, that is used, for example, to authenticate a user when the user requests access to the domain. Note that the user may be a human user, or may be a software process that is assigned a local user identity, such as a print server. Each domain typically has its own administrative tools that allows its system administrator to add, delete, or modify user identities in the user registry. With a multiple domain environment that has several different systems, this means that the system administrator must learn and become proficient in the several different tools that handle identity management in the respective domains.

One way to avoid having multiple user identities for the same user is to force all applications and systems to share a common user registry. This approach may be viable in a homogenous environment (e.g., in a network that only has computers of the same platform type sharing a common security manager and a common security database). However, implementing this approach on a computing environment that includes several different security domains would require that each system and each application be rewritten to access some common user registry for the computing environment. This is not a workable solution.

BRIEF SUMMARY

In one aspect, therefore, provided herein is a method of facilitating processing within a computing environment comprising a first system in a first security domain and a second system in a second security domain. The method includes: creating by a local security manager of the second system a runtime security context in the second system for a user of the first system, the creating being responsive to receipt of a request at the second system from the first system for the runtime security context at the second system and the creating referencing, at least in part, security credentials of the user of the first system provided to the second system by the first system; sending by the second system to the first system at least one of a reference to the runtime security context for the user in the second system which is resolvable within the computing environment or a portable representation of the runtime security context for the user in the second system; and receiving by the second system work from the first system to be performed by the second system, the received work having associated therewith the at least one of the reference to the runtime security context for the user in the second system or the portable representation of the runtime security context for the user in the second system, thereby facilitating processing of the work by the second system.

In another aspect, a computer system is provided for facilitating processing within a computing environment comprising a first system in a first security domain and a second system in a second security domain. The computer system includes a memory and a processor in communication with the memory, wherein the computer system is capable of performing a method, the method comprising: creating by a local security manager of the second system a runtime security context in the second system for a user of the first system, the creating being responsive to receipt of a request at the second system from the first system for the runtime security context at the second system and the creating referencing, at least in part, security credentials of the user of the first system provided to the second system by the first system; sending by the second system to the first system at least one of a reference to the runtime security context for the user in the second system which is resolvable within the computing environment or a portable representation of the runtime security context for the user in the second system; and receiving by the second system work from the first system to be performed by the second system, the received work having associated therewith the at least one of the reference to the runtime security context for the user in the second system or the portable representation of the runtime security context for the user in the second system, thereby facilitating processing of the work by the second system.

In a further aspect, a computer program product is provided for facilitating processing within a computing environment which comprises a first system in a first security domain and a second system in a second security domain. The computer program product includes a storage medium readable by a processing circuit and storing instructions for execution by the processing circuit for performing a method comprising: creating by a local security manager of the second system a runtime security context in the second system for a user of the first system, the creating being responsive to receipt of a request at the second system from the first system for the runtime security context at the second system and the creating referencing, at least in part, security credentials of the user of the first system provided to the second system by the first system; sending by the second system to the first system at least one of a reference to the runtime security context for the user in the second system which is resolvable within the computing environment or a portable representation of the runtime security context for the user in the second system; and receiving by the second system work from the first system to be performed by the second system, the received work having associated therewith the at least one of the reference to the runtime security context for the user in the second system or the portable representation of the runtime security context for the user in the second system, thereby facilitating processing of the work by the second system.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A & 2B are a flowchart of one embodiment of a process for projecting an identity context across different security domains of a computing environment, in accordance with one or more aspect of the present invention.

DETAILED DESCRIPTION

Generally stated, provided herein is a facility for enhancing processing within a computing environment comprising multiple security domains. The facility allows for the projection of security credentials of a user of a first system in a first security domain to a second system in a second security domain of a computing environment. The back projected security credentials of the user in the second system comprise, for example, a reference to a runtime security context for the user in the second system resolvable within the computing environment, or a portable representation of the runtime security context for the user in the second system. These credentials are subsequently associated with work transferred from the first system to the second system. The work has associated therewith the reference to the runtime security context for the user in the second system or the portable representation of the runtime security context for the user in the second system, depending upon, for example, the particular type of application or component within the first operating system requiring work at the second operating system. By way of example, embodiments of the invention are described herein with reference to a single IBM System z sysplex. As used herein, a "sysplex" comprises a system complex and includes, for example, a cluster of operating systems.

Multiple security domains can exist within a single IBM System z sysplex customer installation. A system installation might comprise one or more machines based on the z/Architecture®, offered by International Business Machines Corporation of Armonk, N.Y., U.S.A., and described in an IBM publication entitled "z/Architecture Principles of Operation", IBM Publication No. SA22-7832-07, February 2009, which is hereby incorporated herein by reference in its entirety. (IBM®, System z® and z/Architecture® are registered trademarks of International Business Machines Corporation, Armonk, N.Y., U.S.A. Other names used herein may be registered trademarks, trademarks or product names of International Business Machines Corporation, or other companies). For example, a given customer may configure a sysplex that has one or more z/OS operating system images running within the computing environment which use different, and to various extent dissimilar, z/OS External Security Managers (ESMs).

Figure 1:
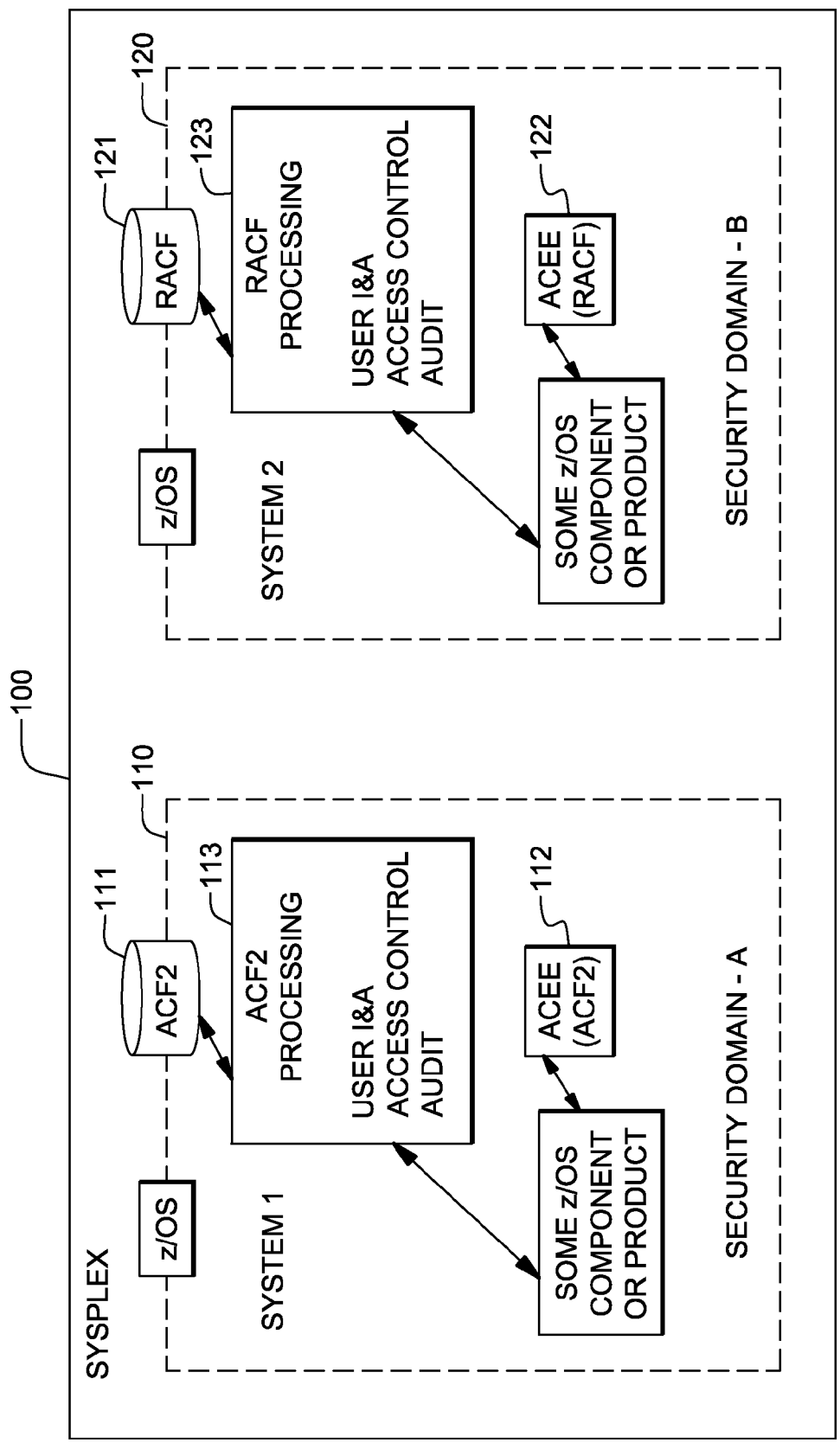
FIG. 1 is a block diagram of one embodiment of a computing environment to incorporate and use one or more aspects of the present invention.

Reference FIG. 1, wherein a sysplex 100 is shown to include a first system (system 1) 110 and a second system (system 2) 120 each of which, in this example, is a z/OS operating system image. The ESM on one z/OS image (i.e., system 2) is an IBM Resource Access Control Facility (RACF) 121, while the ESM on the other z/OS image (i.e., system 1) within the same sysplex 100 is, for example, a Computer Associates' ACF2 111. Use of two or more different External Security Managers results in two or more different security domains being defined within the sysplex. As illustrated in FIG. 1, a first security domain, security domain A encompasses system 1, with ACF2 111, and a second security domain, security domain B, encompasses system 2 with RACF 121. In one aspect, presented herein is a protocol for projecting a user's security credentials (or local security context) in system 1 of security domain A into system 2 of security domain B.

The facilities described herein are based (in one embodiment) upon facilities known formally as z/OS (and/or RACF) Identity Propagation and Translation and generally referred to as ID Prop. These facilities are described in greater detail in U.S. Patent Publication No. 2006/0288228, which is hereby incorporated herein by reference in its entirety, and are further documented with IBM's RACF product publications: (1) z/OS-Security Server RACROUTE Macro Reference, IBM Publication No. SA22-7692-12, Section 3.60 & 3.61, Thirteenth Edition, September 2009, pp. 211-273; (2) z/OS-Security Server RACF Command Language Reference, IBM Publication No. SA22-7687-14, Section 5.45, Fifteenth Edition, October 2009, pp. 392-398; (3) z/OS-Security Server RACF Security Administrator's Guide, IBM Publication No. SA22-7683-13, Chapter 26, Fourteenth Edition, September 2009, pp. 703-715; and (4) z/OS-Security Server RACF Data Areas, IBM Publication No. GA22-7680-11, Twelfth Edition, September 2009, each of which is hereby incorporated herein by reference in its entirety. These publications make it possible for a runtime security context established within a given z/OS image to be projected into another z/OS image when a work request requires (for one reason or another) the facilities of multiple z/OS images in order for the work to be completed. An example of this is the IBM Customer Information Control System (CICS) transaction processing software product where a Terminal Owning Region (TOR) does some initial processing of a given work request, then passes the request off to an Application Owning Region (AOR) for completion. This identity translation improves the accuracy, efficiency and audit-ability of the processing by providing the ability to "propagate" the entirety of the runtime security context, know technically in one example as the z/OS Accessor Environment Element (ACEE) 112,122 (FIG. 1) from one z/OS image (where the TOR runs) to another z/OS image (where the AOR may run).

The problem addressed by the present invention is that an ACEE 112 created within one z/OS security domain (such as but not limited by the ACF2 processing 113 in security domain A), may not be an exact equivalent to an ACEE 122 that is created within another, differing security domain (such as that created by RACF processing 123 in security domain B). This is because, for example, an RACF ACEE 122 may include, or point to by a memory address, certain data areas that are proprietary to the IBM RACF program product, and therefore, are not published interfaces useable by the ACF2 ESM program product on system 1 in security domain A. The opposite scenario is also possible.

Other examples of this problem can arise even when the same program product ESM is used in different systems, but the databases supporting the ESMs are different (e.g., not shared between them). Today, the only choice a customer has in addressing these problems is to limit the implementation to a homogeneous security domain sysplex configuration wherein all ESMs and associated databases within a given sysplex configuration are the same, e.g., all are ACF and all share the same database, or for customer applications to some how cause an entirely new runtime security context, lacking the completeness of the original context, to be instantiated whenever such a security domain traversal is desired. The former choice can interfere with customer information technology consolidation activity, and the later choice bars the advantages of identity propagation.

In view of the above, presented herein is processing that can, through a combination of discovery and customer configuration, be made aware of a multi-ESM topology within the sysplex when it occurs, and to return such information to a potential application or component caller when requested by the caller. This new service also provides the ability for an application, running within one security domain within the sysplex (i.e., a source domain), to request a runtime security context (ACEE) be created within another security domain within the sysplex that is expected to be the target domain to which the source domain will send a work request, and for either a "reference" ACEE that is resolvable within the sysplex or a "portable representation" of the ACEE to be returned to the calling application. This reference or portable representation then flows back with the work request from the first, source domain to the second, target domain, where the target domain resolves it into a local ACEE (i.e., assuming the user and the source domain have been assigned a user ID within the target domain) for use in running the work request in the target domain. The processing described herein overcomes the problem of dissimilar runtime security contexts by allowing an application running in one security domain (source domain) to acquire a runtime security context from the other dissimilar domain (target domain) for use in directing work to that domain. Since the runtime security context is acquired from the target security domain within which the work request is to process, it will be of a form and format that is correct and usable in that security domain. It may be considered "opaque" to the source security domain that acquires it, however, this is not a problem because it is not used as a runtime security context within the source security domain.

The logical facility described above can be implemented on z/OS as an MVS System Authorization Facility (SAF) call-able service. Thus, it could available for use with z/OS ESMs other than RACF; for example, Computer Associates' (CA) ACF2, assuming CA chooses to enhance ACF2 appropriately. Today, RACF's ID propagation mapping filters support the concept of user 'A' within source security domain A being mapped into user T at a target security domain B in accordance with a 'mapping filter' administratively defined at the target RACF domain. This mapping filter concept can be represented by the following nomenclature: A @ SD maps to B @ TD. Also supported are the concepts of multiple users within a given target domain being mapped into a single RACF userID as in *-* @ SD map to C @ TD, where *-* represents z/OS ID Prop external name component filter mapping elements. Also supported by z/OS ID Prop is the concept of any user at any source domain mapping into a common 'default' userID at the target domain. This concept can be represented as *@* maps into Y at TD, (Y being a default user ID within the target domain). As part of this invention, IBM SAF-RACF is enhanced (in one example) to support an additional identity mapping filter concept in that any user identity at a specified source domain could map into an existing user ID at the target domain (TD) when the user ID at the source domain (SD) matches an existing user ID in the target domain by character string compare. Extending the established nomenclature to illustrate this, the mapping filter would look as follows: * at SD maps to '=' at TD. In this case, if a given user ID, or more generally a given user security credential, on the source domain is not found within the target domain, then the mapping operation would fail with a 'user not found' message.

Consider the following examples, wherein 'SD' represents the source security domain and the 'TD' represents the target security domain within the same sysplex (see FIG. 1). Domain SD consists of one or more z/OS system images that share a common security database, and TD likewise consists of one or more z/OS system images that share a common security database, that is not the same database as systems within domain SD. The security domains and associated databases may or may not be of the same manufacturer and model.

(1) With one aspect of the present invention, an application running within domain SD (source security domain), in preparation for sending a work request to domain TD (target security domain), invokes the new service (implementation of the invention) with a request for creation of a runtime security context within a system of domain TD. This initial request contains an ID Prop ICRX (a) (as defined in IBM Publication z/OS Security Server RACF Data Areas, IBM Publication No. GA22-7680-11, September 2009) that is partially complete in that it contains identity data for the user consisting of the user's user ID within domain SD as well as the identity of domain SD (realm or registry). This ICRX is considered to be 'partially complete' because it contains only user identity data and not a reference to a cached identity within the ESM (i.e., a security context). This identity data also contains any other user identity differentiating factors that may be present such as the user's session security label (related to multi-level security processing) and/or the user's 'port-of-entry' into the IT complex.

(2) In another aspect of the invention, that is, the new service (a part of which is running within domain TD, and acting in response to the request from domain SD in accordance with the identity information passed within the ICRX (a), and with the authority predefined within domain TD or domain SD to issue such requests), uses a combination of existing and new functions, with the present invention z/OS Identity Propagation functions (e.g., the mapping support described previously) to create and locally cache an appropriate runtime security context (ACEE) within a system that is within domain TD. In this option, the ID Prop function returns to the new service a complete ICRX (b), with a sysplex scope that "references" the cached ACEE. This ICRX is referred to as 'complete' because it now includes ESM identity cached reference information.

(3) An application running in domain SD and using this option would be expected to soon send the ICRX (c) (i.e., the "reference") back to domain TD with a work request.

(4) The IP Prop function running in domain TD subsequently uses the ICRX (or reference) to locate the cached ACEE and use it to establish the security context within domain TD for executing the requested work function.

In another aspect of the present invention, certain applications could choose to have a complete user runtime security context, in the form of a SAF-RACF ENVR object, known as a RACO (b), returned instead of an ICRX. This option will be necessary in certain application scenarios where reliance on a remote cache entry or security database storage device input/output (I/O) processing at the target may not be tolerated (or possible) at some unpredictable future time, such as to recover from an I/O failure. In such cases, the RACO will be retained in main storage by the application within domain SD, then when needed passed back to domain TD along with the work request. New security manager support per the present invention will assign the RACO (c) to the execution thread (e.g., an MVS task) for execution of the work request within domain TD.

To summarize, the present invention extends the identity translation art to facilitate work among systems, such as z/OS system in a sysplex, and potentially across a network. Considering a parallel sysplex example, and considering the sysplex illustrated in FIG. 1, there are two interconnected z/OS systems, labeled system 1 and system 2. System 1 is running ACF2 as security manager, and system 2 is running RACF, that is, a different security product. Alternatively, system 1 might be running RACF with a set of security definitions in database 1, and system 2 might be running RACF with a different set of security definitions in database 2. Thus, a user on system 1 might have one user identity and on system 2 a different user identity. In either case, there is a problem if the user might run work on system 1, say in an application server such as CICS or Websphere Application Server (WAS), which could spawn additional work to run on system 2. In this case, there is an application spawning some work elsewhere in the sysplex of connected z/OS systems. If system 1 and system 2 have different security managers, then it is not possible to transfer a copy of the user's local security credentials or security context and use the credentials/context directly on system 2, or vice versa. Similarly, even with a single security manager, if system 1 and system 2 have different security databases, it may not be possible to directly use the user's credentials or context from system 1 for work on system 2. By way of example, system 1 is referred below as the source system, and system 2 the target system. Note that from the view point of system 1, system 2 is a "remote" system, and vice versa.

Figure 2B:
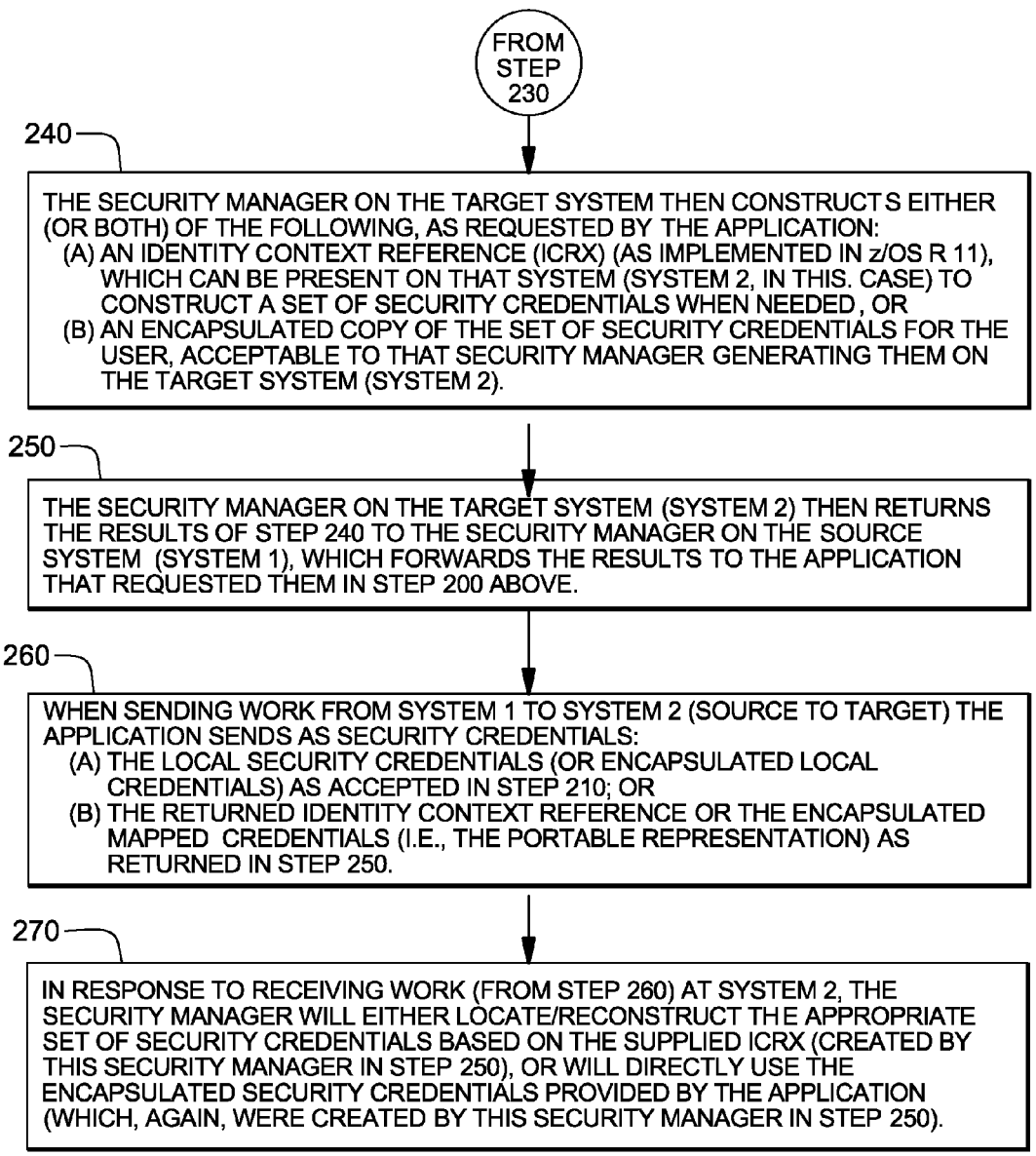

Aspects of the present invention are further described below with reference to the processing flow embodiment thereof illustrated in FIGS. 2A & 2B. Referring to STEP 200, on system 1, when an application or other component wishes to send work to system 2, it can issue a new query operation providing (a) the user's local security credentials (comprising e.g., a user ID, group membership, port-of-entry, security label, and other security relevant information maintained by the system 1 security manager), and (b) the destination system's name within the sysplex, or an address in some form if outside of the sysplex. In STEP 210, in response to the generated query, the local security manager of system 1 determines whether the user's security credentials, or alternatively, the user's local security context, is acceptable to the target system. As used herein, a determination of "acceptable" encompasses two inquiries namely: is the target system using the same security manager as the source system, and if so, is it also using the same security database (or one compatible for user identities, group memberships, etc.)? If the credentials are acceptable, then the local security manager returns an indication to the application or other component (i.e., the caller) that the local security credentials/context can be sent to the target system, and will optionally return an encapsulated copy of the local security credentials (or security context) that the application can send to the target system with its work request.

In STEP 220, if the local credentials are deemed unacceptable to the target system, then the local security manager of the source system contacts (via network data flows or sysplex data flows) the local security manager of the target system (e.g., FIG. 1, ACF2 in system 1) contacts RACF in system 2) and provides the user's security credential information in a neutral format understandable by all security managers in the computing environment. By way of example, the distributed-identity-user-name and distributed-identity-registry name defined in z/OS Security Server RACF Command Language Reference, IBM Publication No. SA22-7687-14, Section 5.45, RACMAP Command (October 2009), may be used as a neutral format understandable by all security managers. To facilitate this capability, names may be more tailored in format to z/OS than to distributed systems. There may be additional information provided, as typically supplied on RACROUTE REQUEST=VERIFY (see, for example, z/OS Security Server RACROUTE Macro Reference, IBM Publication No. SA22-7692-12, Section 3.60, 3.61 (September 2009)), including, but not limited to such items as an application name, port-of-entry class and name (e.g., TERMINAL T25), a group name, and a security label. The exact format in which these elements are specified is not relevant for the purposes of the present invention. For example, the neutral format might be USER=name1, GROUP=name2, POECLASS=TERMINAL, POE=T25, or it could be a more structured set of data, such as:

COUNT DC F'4' (which could be larger value if more fields are supplied, or a smaller value with fewer supplied)
FIELDNAME1 DC CL8'USER'
FIELDVALUE1 DC CL8'name1'
FIELDNAME2 DC CL8'GROUP'
FIELDVALUE2 DC CL8'name2'
FIELDNAME3 DC CL8'POECLASS'
FIELDVALUE3 DC CL8'TERMINAL'
FIELDNAME4 DC CL8'POE'
FIELDALUE4 DC CL8'T25'

Alternatively, the neutral format could be specified in an XML format, etc. The point of the neutral format is that it is a form of keyword/value pairs, providing (for example) information typically associated with RACROUTE REQUEST=VERIFY.

In STEP 230, the security manager on the target system (e.g., RACF in system 2) receives the neutral format security credentials, and performs a "mapping" operation using rules established by the system 2 security administrator(s) to derive a set of security credentials acceptable to system 2. This mapping operation may involve: (a) a lookup operation with inputs of the source system user ID and source system name (system 1) and possibly additional identification for the system (e.g., sysplex name, network domain, or other). The output is a user ID acceptable to the target system (i.e., system 2); (b) a similar lookup operation is performed for each group name(s) provided in the neutral format security credentials, to enable transformation into group names acceptable to the target system; (c) a similar lookup for any port-of-entry information associated with the user is performed, that is if desired by the security administrator of the second system; and (d) a similar lookup is performed for the security label associated with the user by the target system, that is if desired by the security administrator of the target system.

The security manager on the target system in STEP 240 then constructs either (or both) of the following as requested by the application: (a) an identity context reference (ICRX), which can be subsequently presented to the target system to construct a set of security credentials (i.e., the runtime security context) for the user when needed; or (b) an encapsulated copy of the set of security credentials for the user, acceptable to the local security manager generating them on the target system (i.e., a portable representation of the runtime security context for the user in the target system).

In STEP 250, the security manager on the target system returns the results of STEP 240 to the security manager on the source system, which then forwards the results to the application or component that requested them in STEP 200. The application/component subsequently sends work form system 1 to system 2 in STEP 260 using as security credentials (a) the local credentials (or encapsulated local credentials) as returned in STEP 210; or (b) the returned ICRX or the returned encapsulated mapped credentials as provided in STEP 250.

In STEP 270, when the target system receives work via STEP 260, the local security manager will either locate or reconstruct the appropriate runtime security context based on the supplied ICRX (created by that security manager in STEP 240), or will directly use the encapsulated security credentials (i.e., the portable representation of the runtime security context), provided by the application (which, again, were created by this security manager in STEP 240 originally).

Optionally, the security manager, when providing the encapsulated credentials in STEP 240, can protect them from modification through the use of cryptographic caching and digital signature operations, so that in STEP 270, the security manager can detect tampering and reject them if they have been modified. This is not needed for the ICRX, since the security manager will rebuild the credentials from an ICRX or will use a copy that it has maintained in its own protected cache, but can be valuable as a protection mechanism for the case where the encapsulated credentials leave the security manager's control and flow back to the application in the source system, and in a particular, one on a different system within the sysplex.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 3:
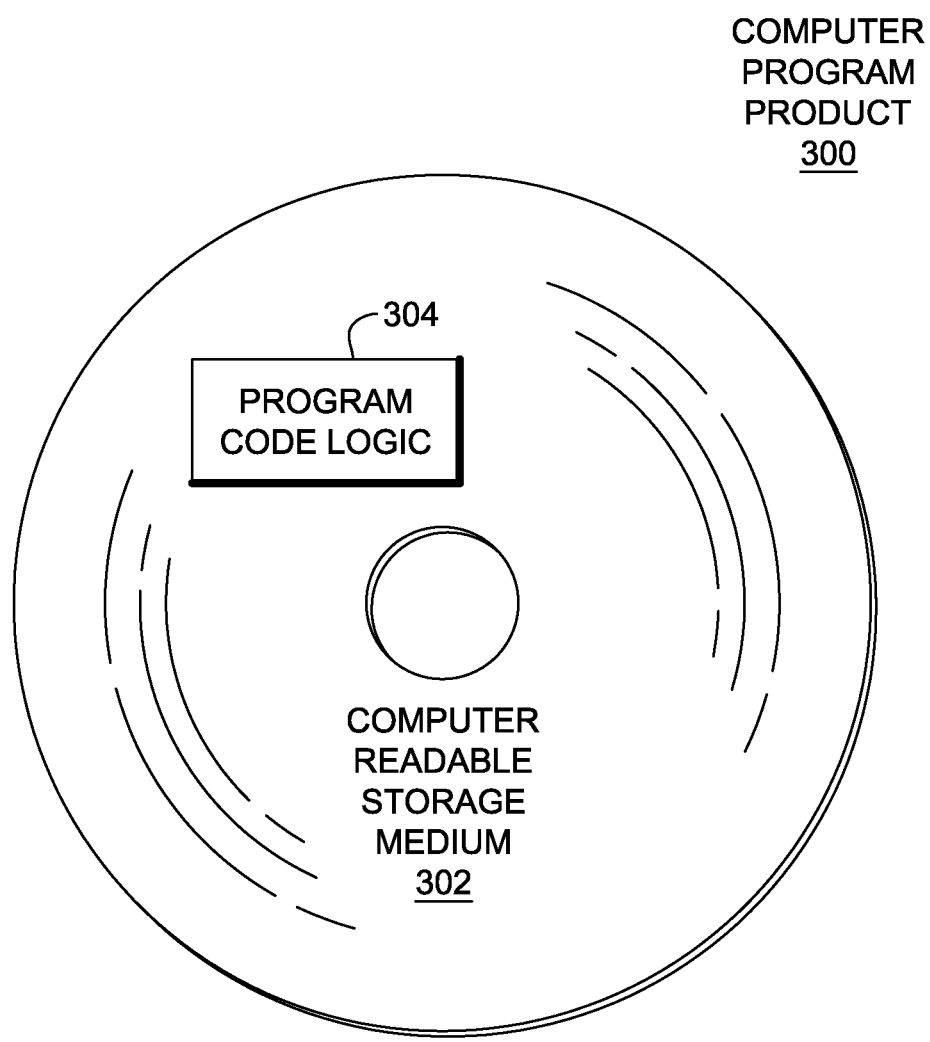
FIG. 3 depicts one embodiment of a computer program product incorporating one or more aspects of the present invention.

Referring to FIG. 3, in one example, a computer program product 300 includes, for instance, one or more computer readable storage media 302 to store computer readable program code means or logic 304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational STEPs to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples.

Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating processing within a computing environment comprising a first system in a first security domain and a second system in a second security domain, the method comprising:

based on a local security manager of the first system in the first security domain determining that a local security context of a user of the first system in the first security domain is not acceptable to the second system in the second security domain, receiving at a local security manager of the second system from the local security manager of the first system a request that a runtime security context for the user be created in the second system, and that a reference to the runtime security context or a portable representation of the runtime security context be returned to the local security manager of the first system;

based on receiving the request at the local security manager of the second system from the local security manager of the first system, creating by the local security manager of the second system the runtime security context in the second system for the user of the first system, the creating referencing, at least in part, security credentials of the user of the first system provided to the second system by the first system;

providing by the local security manager of the second system to the local security manager of the first system at least one of a reference to the runtime security context for the user in the second system which is resolvable within the computing environment or a portable representation of the runtime security context for the user in the second system; and receiving by the second system work from the first system to be performed by the second system, the received work to be performed by the second system having associated therewith the at least one of the reference to the runtime security context for the user in the second system or the portable representation of the runtime security context for the user in the second system, thereby facilitating processing of the work by the second system.

2. The method of claim 1, wherein the local security manager of the second system and the local security manager of the first system are different types of security managers.

3. The method of claim 1, wherein the local security manager of the second system and the local security manager of the first system are a same type of security manager, but reference different sets of security credential definitions in different databases.

4. The method of claim 1, further comprising in response to ascertaining that the second system comprises a same type of security manager as the first system and to ascertaining that the local security manager of the second system employs a same or a compatible security set of credential definitions as the first system, forwarding work from the first system to the second system with the local security context of the user in the first system associated therewith for use at the second system as the runtime security context of the user in the second system, without performing the creating, the providing and the receiving.

5. The method of claim 1, wherein in addition to receiving the request at the second system to create the runtime security context for the user in the second system, the second system receives from the first system neutral format security credentials for the user understandable by the local security manager of the first system and the local security manager of the second system.

6. The method of claim 5, wherein the creating by the local security manager of the second system further comprises receiving the neutral format security credentials and performing a mapping thereof using rules established in the second system to derive a set of security credentials of the user acceptable to the second system, wherein the mapping comprises:
  performing a lookup operation employing at least one of a user ID of the user in the first system and a name of the first system, and outputting in response thereto a user ID acceptable to the second system;
  performing a lookup operation for each group name provided in the neutral format security credentials to enable transformation thereof into a corresponding group name acceptable to the second system;
  ascertaining from the neutral format security credentials port-of-entry information associated with the user, if required by the second system;
  ascertaining from the second system a usable security label for the user, if required by the second system; and
  using the set of security credentials for the user acceptable to the second system in creating the runtime security context for the user in the second system.

7. The method of claim 1, wherein responsive to receiving in association with the work the reference to the runtime security context for the user in the second system which is resolvable within the computing environment, the second system uses the reference to provide the runtime security context for the user in the second system for performing the received work in the second system.

8. The method of claim 1, wherein responsive to receiving the portable representation of the runtime security context in association with the work, the second system directly uses the portable representation of the runtime security context of the user in the second system in performing the received work in the second system.

9. A computer system for facilitating processing within a computing environment comprising a first system in a first security domain and a second system within a second security domain, the computer system comprising:
  a memory; and
  a processor in communication with the memory, wherein the computer system is capable of performing a method, the method comprising:
    based on a local security manager of the first system in the first security domain determining that a local security context of a user of the first system in the first security domain is not acceptable to the second system in the second security domain, receiving at a local security manager of the second system from the local security manager of the first system a request that a runtime security context for the user be created in the second system, and that a reference to the runtime security context or a portable representation of the runtime security context be returned to the local security manager of the first system;
    based on receiving the request at the local security manager of the second system from the local security manager of the first system, creating by the local security manager of the second system the runtime security context in the second system for the user of the first system, the creating referencing, at least in part, security credentials of the user of the first system provided to the second system by the first system;
    providing by the local security manager of the second system to the local security manager of the first system at least one of a reference to the runtime security context for the user in the second system which is resolvable within the computing environment or a portable representation of the runtime security context for the user in the second system; and
    receiving by the second system work from the first system to be performed by the second system, the received work to be performed by the second system, having associated therewith the at least one of the reference to the runtime security context for the user in the second system or the portable representation of the runtime security context for the user in the second system, thereby facilitating processing of the work by the second system.

10. The computer system of claim 9, wherein the local security manager of the second system and the local security manager of the first system are different types of security managers.

11. The computer system of claim 9, wherein the local security manager of the second system and the local security manager of the first system are a same type of security manager, but reference different sets of security credential definitions in different databases.

12. The computer system of claim 9, further comprising in response to ascertaining that the second system comprises a same type of security manager as the first system and to ascertaining that the local security manager of the second system employs a same or a compatible security set of credential definitions as the first system, forwarding work from the first system to the second system with the local security context of the user in the first system associated therewith for use at the second system as the runtime security context of the user in the second system, without performing the creating, the providing and the receiving.

13. The computer system of claim 9, wherein in addition to receiving the request at the second system to create the runtime security context for the user in the second system, the second system receives from the first system neutral format security credentials for the user understandable by the local security manager of the first system and the local security manager of the second system.

14. The computer system of claim 13, wherein the creating by the local security manager of the second system further comprises receiving the neutral format security credentials and performing a mapping thereof using rules established in the second system to derive a set of security credentials of the user acceptable to the second system, wherein the mapping comprises:
  performing a lookup operation employing at least one of a user ID of the user in the first system and a name of the first system, and outputting in response thereto a user ID acceptable to the second system;
  performing a lookup operation for each group name provided in the neutral format security credentials to enable transformation thereof into a corresponding group name acceptable to the second system;
  ascertaining from the neutral format security credentials port-of-entry information associated with the user, if required by the second system;
  ascertaining from the second system a usable security label for the user, if required by the second system; and
  using the set of security credentials for the user acceptable to the second system in creating the runtime security context for the user in the second system.

15. A computer program product for facilitating processing within a computing environment comprising a first system in a first security domain and a second system in a second security domain, the computer program product comprising:
  a non-transitory computer readable storage medium readable by a processing circuit and storing instructions for execution by the processing circuit for performing a method comprising:
    based on a local security manager of the first system in the first security domain determining that a local security context of a user of the first system in the first security domain is not acceptable to the second system in the second security domain, receiving at a local security manager of the second system from the local security manager of the first system a request that a runtime security context for the user be created in the second system, and that a reference to the runtime security context or a portable representation of the runtime security context be returned to the local security manager of the first system;
    based on receiving the request at the local security manager of the second system from the local security manager of the first system, creating by a local security manager of the second system the runtime security context in the second system for the user of the first system, the creating referencing at least in-part, security credentials of the user of the first system provided to the second system by the first system;
    providing by the local security manager of the second system to the local security manager of the first system at least one of a reference to the runtime security context for the user in the second system which is resolvable within the computing environment or a portable representation of the runtime security context for the user in the second system; and
    receiving by the second system work from the first system to be performed by the second system, the received work to be performed by the second system having associated therewith the at least one of the reference to the runtime security context for the user in the second system or the portable representation of the runtime security context for the user in the second system, thereby facilitating processing of the work by the second system.

16. The computer program product of claim 15, wherein the local security manager of the second system and the local security manager of the first system are different types of security managers.

17. The computer program product of claim 15, wherein the local security manager of the second system and the local security manager of the first system are a same type of security manager, but reference different sets of security credential definitions in different databases.

18. The computer program product of claim 15, wherein the method further comprises, in addition to receiving the request at the second system to create the runtime security context for the user in the second system, receiving by the second system from the first system neutral format security credentials for the user understandable by the local security manager of the first system and the local security manager of the second system, and wherein the creating by the local-security manager of the second system further comprises receiving the neutral format security credentials and performing a mapping thereof using rules established in the second system to derive a set of security credentials of the user acceptable to the second system, wherein the mapping comprises:
  performing a lookup operation employing at least one of a user ID of the user in the first system and a name of the first system, and outputting in response thereto a user ID acceptable to the second system;
  performing a lookup operation for each group name provided in the neutral format security credentials to enable transformation thereof into a corresponding group name acceptable to the second system;
  ascertaining from the neutral format security credentials port-of-entry information associated with the user, if required by the second system;
  ascertaining from the second system a usable security label for the user, if required by the second system; and
  using the set of security credentials for the user acceptable to the second system in creating the runtime security context for the user in the second system.

* * * * *